United States Patent
Mori et al.

(10) Patent No.: US 7,848,971 B1
(45) Date of Patent: Dec. 7, 2010

(54) INTEGRATED ONLINE CHAT WITHIN AN INCOME TAX PREPARATION PRODUCT

(75) Inventors: Kenichi Mori, Carlsbad, CA (US); Justin C. Marr, San Diego, CA (US); Cathy C. Goode, San Diego, CA (US); Vincent Cheng, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 784 days.

(21) Appl. No.: 11/365,576

(22) Filed: Feb. 28, 2006

(51) Int. Cl.
  *G06F 15/16* (2006.01)
  *G07F 19/00* (2006.01)

(52) U.S. Cl. .................. 705/31; 709/207
(58) Field of Classification Search ............ 705/19, 705/31, 35, 36 T; 379/93.12; 709/204, 229; 719/314, 317
See application file for complete search history.

(56) References Cited

U.S. PATENT DOCUMENTS

| | | | |
|---|---|---|---|
| 5,958,014 A * | 9/1999 | Cave | 709/229 |
| 6,202,052 B1 * | 3/2001 | Miller | 705/31 |
| 6,223,165 B1 * | 4/2001 | Lauffer | 705/8 |
| 6,915,336 B1 * | 7/2005 | Hankejh et al. | 709/219 |
| 7,219,072 B1 * | 5/2007 | Sundaresan | 705/26 |
| 7,263,526 B1 * | 8/2007 | Busey et al. | 1/1 |
| 2002/0091607 A1 * | 7/2002 | Sloan et al. | 705/36 |
| 2002/0111888 A1 * | 8/2002 | Stanley et al. | 705/31 |
| 2002/0198810 A1 * | 12/2002 | Roger | 705/36 |
| 2005/0038722 A1 * | 2/2005 | Throndson et al. | 705/31 |
| 2005/0132056 A1 * | 6/2005 | Creamer et al. | 709/227 |
| 2006/0047615 A1 * | 3/2006 | Ravin et al. | 706/50 |
| 2006/0174340 A1 * | 8/2006 | Santos et al. | 726/21 |
| 2006/0190344 A1 * | 8/2006 | Sang et al. | 705/26 |
| 2007/0033116 A1 * | 2/2007 | Murray | 705/31 |

* cited by examiner

*Primary Examiner*—Wing F Chan
*Assistant Examiner*—Jonathan Willis
(74) *Attorney, Agent, or Firm*—Osha · Liang LLP

(57) ABSTRACT

A computer implemented method involves requesting assistance while completing a first page of an online financial document, and engaging in a discussion using a chat window to obtain assistance in completing the online financial document, where the chat window is integrated with the online financial document, and where the chat window is displayed on a same screen as the online financial document.

24 Claims, 4 Drawing Sheets

INTEGRATED ONLINE CHAT WITHIN AN INCOME TAX PREPARATION PRODUCT

BACKGROUND

Every year millions of people, companies, and other institutions file various documents with the different governing bodies, such as agencies and services of local, state and national governments. The documents typically are directed toward such things as filing taxes, inventory, and accounting filings, medical reimbursement filings, and the like. Each document typically has multiple data-containing fields into which a user is required to enter data.

Generally, the data-containing fields in each of the documents are completed with data representing a concatenation of various pieces of information. For example, in an accounting sheet, the data representing the amount of sales may include several pieces of information (e.g., the amount of sales completed (payment received and product shipped), the amount of sales ordered (payment received and product not yet shipped), amount of sales received under contract (payment not received and product not yet shipped), etc.).

The parameters that define which pieces of information to include in the data are typically governed by one or more regulations. For example, a regulation may specify that sales received under a contract without a received payment or a shipped product is not included on the accounting sheet.

While the documents are being filed with the different governing bodies, the different governing bodies constantly pass new regulations concerning the data entered in the documents. Specifically, the parameters for entering the data may change. For example, a person who marries within a tax year may or may not file a joint tax return with his/her spouse. As another example, a recent regulation passed now allows a taxpayer to claim both state and local tax deductions for sales or income tax. In addition, the regulation specifies that tax for motor vehicles may be added to the deduction, but only at a general sales tax rate. In order to comply with the regulations passed by all of the governing bodies, the person entering the data must be aware of new regulations.

To file the various documents and ensure that the data entered into the documents is accurate and complies with standard regulations, software products that are directed toward filing the document may be used by people, companies, and institutions. Typically, software products include several methods for simplifying inputting the data into the documents. For example, a software product may separate the documents into forms, request data using user-friendly questions, and perform automatic calculations of different fields within the forms. By providing an easy-to-use user interface, a person is able to navigate the complex documents and ensure compliance with regulations.

Often times, the software products that aid in filing the document provide support services for assistance in completing the document. For example, contact information, such as e-mail addresses, telephone numbers, etc., for support agents that are available to assist a user may be provided on the document. Users can typically receive immediate support services via telephone, or if the user is willing to wait for a response, the user can send an e-mail about any questions associated with completing the document. Some software products provide live assistance via a chat window or web page while the user is completing the document. To access this type of assistance, the user has to open the online financial document and launch the chat window or web page in a separate window, thus requiring the user to tile windows or navigate between the online document and the support window.

SUMMARY

In general, in one aspect, the invention relates to a computer implemented method. The computer implemented method comprises requesting assistance while completing a first page of an online financial document, and engaging in a discussion using a chat window to obtain assistance in completing the online financial document, wherein the chat window is integrated with the online financial document, and wherein the chat window is displayed on a same screen as the online financial document.

In general, in one aspect, the invention relates to a user interface. The user interface comprises an online financial document comprising a form with a plurality of fields displayed on a screen, and a chat window displayed on the screen with the online financial document and configured to allow real-time assistance in completing the online financial document, wherein the chat window is integrated with the online financial document.

In general, in one aspect, the invention relates to a method for providing assistance in a financial document. The method comprises integrating a chat window with an online financial document, wherein integrating the chat window with the online financial document comprises displaying the online financial document on a screen, and displaying the chat window on the screen with the online financial document, transmitting a first message to a support agent about the online financial document using the chat window, and receiving a second message from the support agent about the online financial document using the chat window.

In general, in one aspect, the invention relates to a computer usable medium. The computer usable medium comprises computer readable program code embodied therein for causing a computer system to request assistance while completing a first page of an online financial document, and engage in a discussion using a chat window to obtain assistance in completing the online financial document, wherein the chat window is integrated with the online financial document, and wherein the chat window is displayed on a same screen as the online financial document.

Other aspects of the invention will be apparent from the following description and the appended claims.

DETAILED DESCRIPTION

Figure 1:
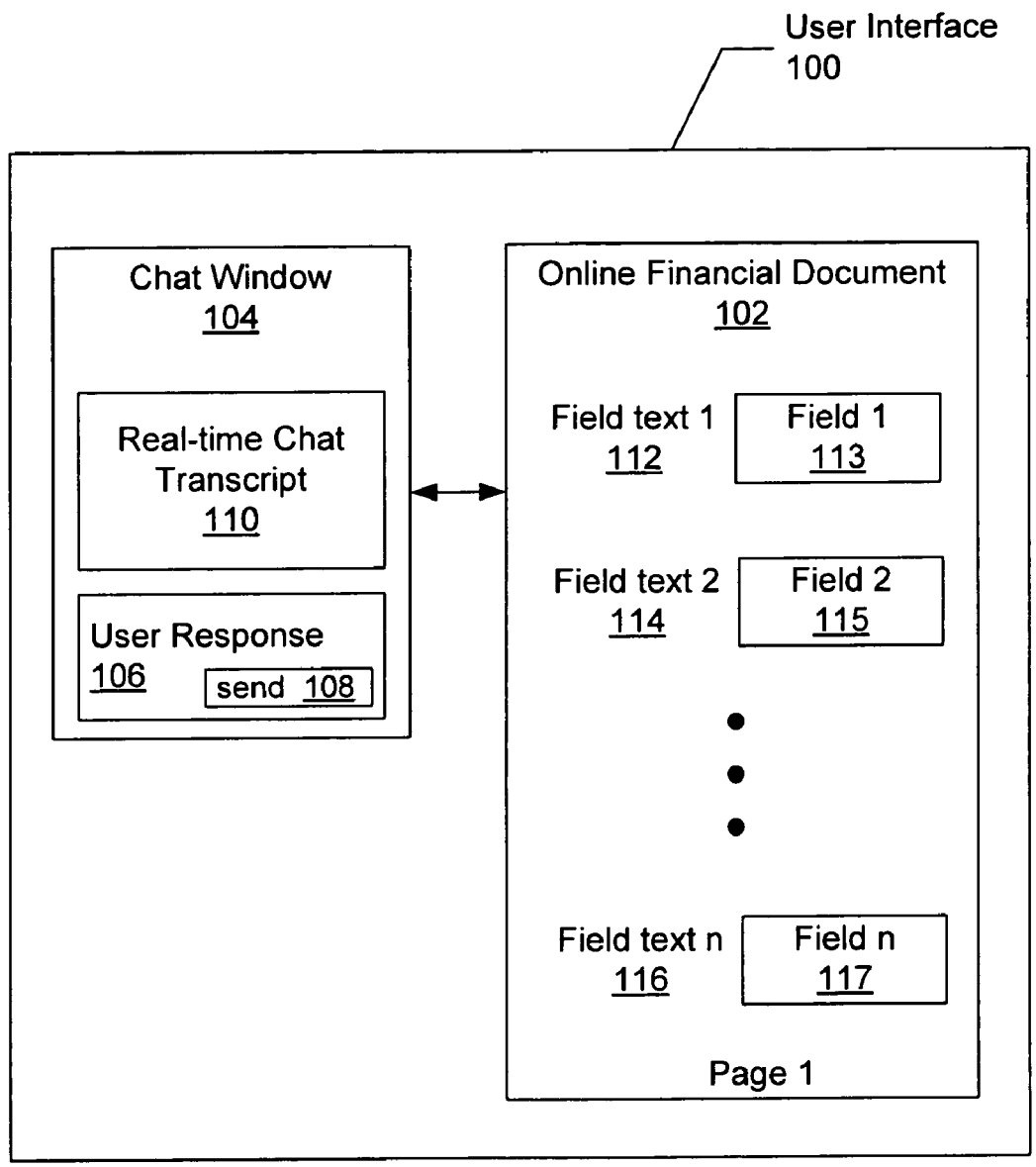
FIG. 1 shows a system for integrating a chat window with an online financial document in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, one or more embodiments of the invention relate to a method for providing real-time help while completing an online financial document. More specifically, one or more embodiments of the invention relate to integrating a chat (i.e., instant message) window with an online financial document. Further, one or more embodiments of the invention integrate a chat window with an online tax application to deliver real-time help to customers completing the tax application.

FIG. 1 shows a system for providing assistance while completing an online financial document in accordance with one embodiment of the invention. Specifically, FIG. 1 shows a user interface (100) and an online financial document (102) integrated with a chat window (104). Each of the aforementioned components is explained in detail below.

In one or more embodiments of the invention, the user interface (100) represents the display screen that a user filling out an online financial document may see on his/her personal computer, personal digital assistant, mobile phone, or any other electronic device with a display screen that can be used to complete the online financial document (102). Further, the user interface (100) is associated with a software product designed to facilitate the completion and filing of the online financial document (102). In one or more embodiments of the invention, the user interface (100) runs on a standard web browser, such as Internet Explorer® ("Internet Explorer" is a registered trademark of Microsoft Corporation, Redmond, Wash., USA), FireFox® ("FireFox" is a registered trademark of Mozilla Foundation, Mountain View, Calif., USA), etc. Online financial documents may be, for example, tax documents, bank documents, healthcare documents, employment documents, insurance documents, trusts/wills, marriage documents, mortgage documents, etc. Further, online financial documents may be associated with software products such as TurboTax® ("TurboTax" is a registered trademark of Intuit, Inc., Mountain View, Calif., USA) for tax documents, Quicken® ("Quicken" is a registered trademark of Intuit, Inc., Mountain View, Calif., USA) for bank documents, etc.

In one or more embodiments of the invention, the online financial document (102) may include one or more forms. Each form has several field texts displayed adjacent to corresponding fields to be completed (i.e., field text 1 (112) corresponds to field 1 (113), field text 2 (114) corresponds to field 2 (115), field text n (116) corresponds to field n (117)). Those skilled in the art will appreciate that field texts and corresponding fields may be displayed in configurations other than the one shown in FIG. 1. For example, field texts and corresponding fields may be vertically adjacent, diagonally adjacent, etc.

Continuing with FIG. 1, as described above, embodiments of the invention relate to providing assistance to users that are completing the online financial document (102). In one or more embodiments of the invention, the user interface (100) includes a chat window (104), which is integrated with the online financial document (102). That is, the software product that displays the online financial document (102) also includes logic for displaying the chat window (104) along with the online financial document (102). In one or more embodiments of the invention, the software product that integrates the chat window (104) and the online financial document (102) incorporates logic for the chat window (104) such that the chat window (104) does not refresh each time the online financial document (102) is updated, modified, or navigated. In other words, while the user navigates between different pages or different forms of the online financial document (102), the chat window (104) is constantly visible and remains unchanged. Thus, in one or more embodiments of the invention, the chat window (104) is displayed on each and every screen of the online financial document (102).

Those skilled in the art will appreciate that the chat window remains visible and unchanged as long as the user is navigating within the software product associated with the online financial document. Once the user navigates outside of the financial document, the chat window may no long be visible. In one or more embodiments of the invention, if a user does not need any assistance in completing the online financial document, the user may close the chat window upon initiating execution of (i.e., logging into) the software product. In this case, the chat window does not appear while navigating between different portions of the online financial document. Alternatively, a global default setting may be set by the user indicating that the chat window should or should not be displayed while using the software product. Further, those skilled in the art will appreciate that the chat window may be displayed at any position within the same screen as the online financial document. For example, the chat window may be displayed horizontally above (or below) the online financial document instead of vertically next to the online financial document, as shown in FIG. 1.

Returning to FIG. 1, when a user wishes to request assistance using the chat window (104), the user may type or write a message using an input device, such as a mouse or keyboard, of the user's electronic device (e.g., a computer, phone, digital assistant, or similar device) into the user response (106) portion of the chat window (104). To send the message to a support agent on the other end, the user uses the send button (108) or its equivalent on the chat window (104). Upon receiving a response from the support agent, a real-time (i.e., live) discussion may take place between the user and the support agent via the chat window (104). Thus, both the user and the support agent can exchange instant messages using the chat window (104), while a transcript of the real-time discussion is recorded in the chat transcript (110) portion of the chat window (104). When the user has received enough assistance from the support agent to complete a portion of or the entire online financial document, the user may close the chat window. In one or more embodiments of the invention, the software product may save and store the contents of the chat transcript (110) until the user has completed or filed the online financial document. For example, in one or more embodiments of the invention, the state of the chat window may be stored on a back-end server on the support end of the software product. Alternatively, the software product may allow the user to delete the contents of the chat transcript (110) at any time.

Figure 2:
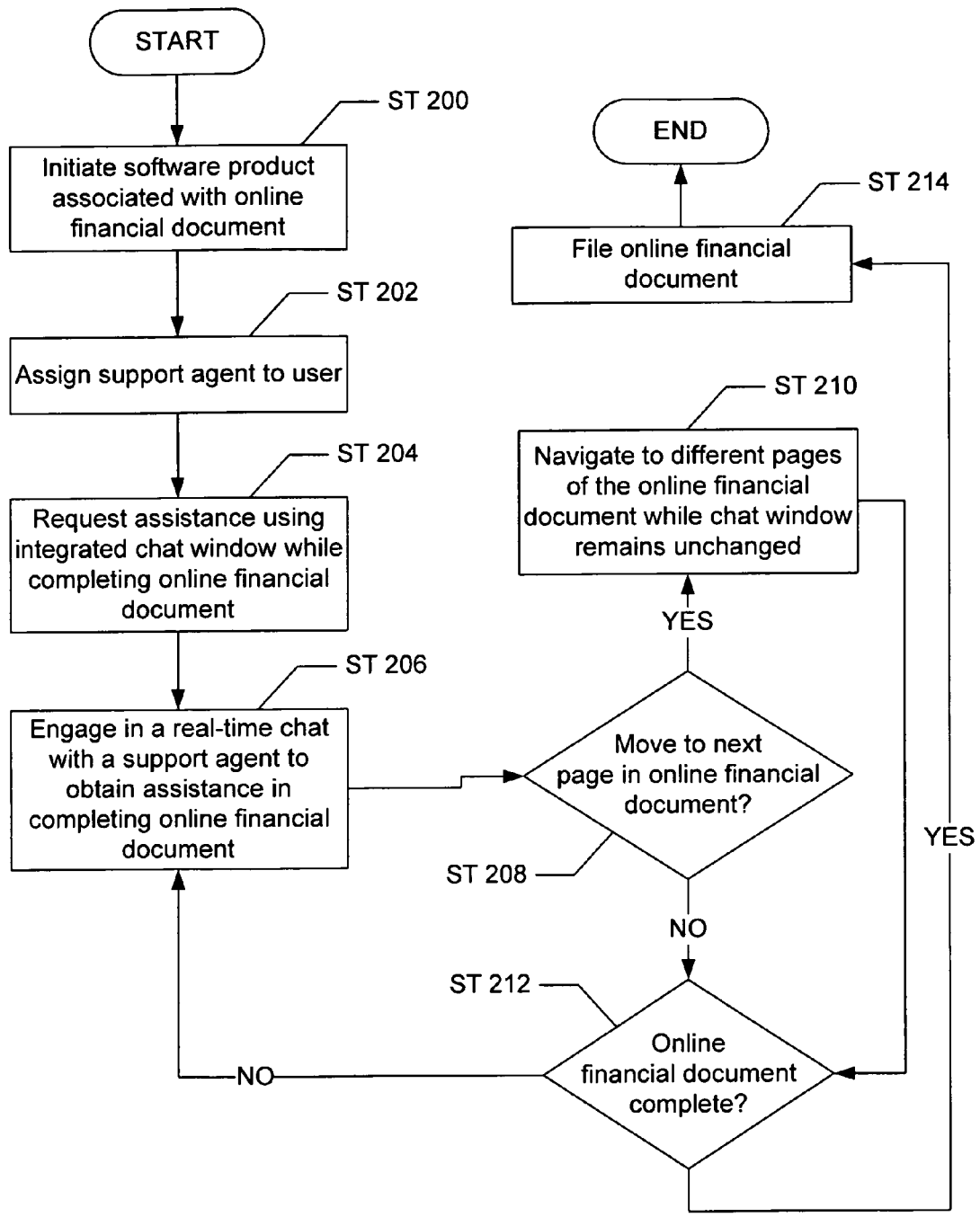
FIG. 2 shows flowchart of a method for using a chat window integrated with an online financial document in accordance with one or more embodiments of the invention.

FIG. 2 shows a flow chart for using an integrated chat window while completing an online financial document in accordance with one embodiment of the invention. Initially, a user initiates a software product associated with an online financial document to be filed by the user (Step 200). The software product may be initiated by logging into the software product using basic authentication credentials such as a username and a password. Subsequently, in one or more embodiments of the invention, a support agent may be assigned to the user (Step 202). Alternatively, in one or more embodiments of the invention, multiple support agents may be ready to receive messages from users, without any particular support agent being assigned to a particular user. Subsequently, the user requests assistance while completing the online financial document using the chat window (Step 204). That is, the user sends a message via the chat window to a support agent that is trained to provide assistance associated with the online financial document.

In one or more embodiments of the invention, the user may be able to choose the level of assistance the user requires. Said another way, support agents trained on different technical levels of the online financial document and/or the software product itself may be available for the user. In this case, the chat window may include an option to choose from various levels of expertise, depending on the type of question the user asks. For example, the user may wish to ask basic questions regarding the meaning of certain field texts, whether or not the user has inputted the correct information, the deadline for filing the online financial document, etc. Alternatively, the user can ask for assistance regarding complex calculations that may be required for completion of particular fields in the online financial document or a question regarding a detailed accounting guideline or regulation cited by the online financial document.

Upon choosing or being assigned a support agent, the user engages in a discussion with the support agent to obtain assistance in completing the online financial document (Step 206). As described above, the support agent can view the user's display screen while the user is viewing the same display screen. Thus, in one or more embodiments of the invention, the support agent is able to know exactly which page and which field text the user may be referring while asking a question using the chat window. Further, in one or more embodiments of the invention, the support agent may be configured to control the user's display screen within the software product associated with the online financial document. That is, the support agent may take control of the user's display screen to complete portions of the online financial document, make notes for the user on the online financial document, point the user to a correct location for a particular piece of information, etc.

Those skilled in the art will appreciate that a delay between the time that modifications are made on the user end of the online financial document and the time that the support agent's display screen shows the same modifications may exist. For example, a 0.5 second delay may exist between what the user sees on his/her display and what the support agent sees on his/her display. In one or more embodiments of the invention, the software product may control the delay between the user's display and the support agent's display. Further, those skilled in the art will appreciate that the support agent's display may not include all the same features as the user's display. For example, the support agent may not be able to view where the user's mouse is pointing at any given point in time on the screen because mouse movement changes very rapidly.

Continuing with FIG. 2, in one or more embodiments of the invention, the user may wish to move to another page of the online financial document (Step 208). If the user needs to view a different page of the online financial document, then the user navigates to different pages while the chat window remains unchanged (Step 210). Said another way, the chat window is constantly visible while the user navigates between various pages of the online financial document. Thus, the information displayed in the chat window, including the transcript of the discussion between the user and the support agent, remains constantly visible on every screen of the online financial document. At this stage, a determination is made as to whether the online financial document is complete (Step 212). If the online financial document is complete, then the online financial document may be filed (Step 214) and the process ends.

Alternatively, the user may wish to save the online financial document and file at a later time. If the online financial document is not complete, then the user may continue the real-time chat discussion with the support agent to complete the online financial document (Step 206).

Those skilled in the art will appreciate that the user may not complete the entire online financial document in one sitting, in which case the user may log out of the software product and return to the online financial document at a later time. In this case, a different support agent may be randomly assigned to the user the next time the user logs into the software product and continues working on the online financial document. Alternatively, in one or more embodiments of the invention, the software product may include a feature that allows the user to request the same support agent each time the user logs into the software product. Further, in one or more embodiments of the invention, when a user logs out of the software product, the contents of the chat window with the support agent may be saved and displayed again when the user logs in at a later point in time. Thus, the user can view a transcript of all the previous chat questions and answers exchanged. This may be useful for the user if she wishes to double check her work and needs to remember the meaning of one or more field texts, the technical calculations asked about previously, etc.

Figure 3:
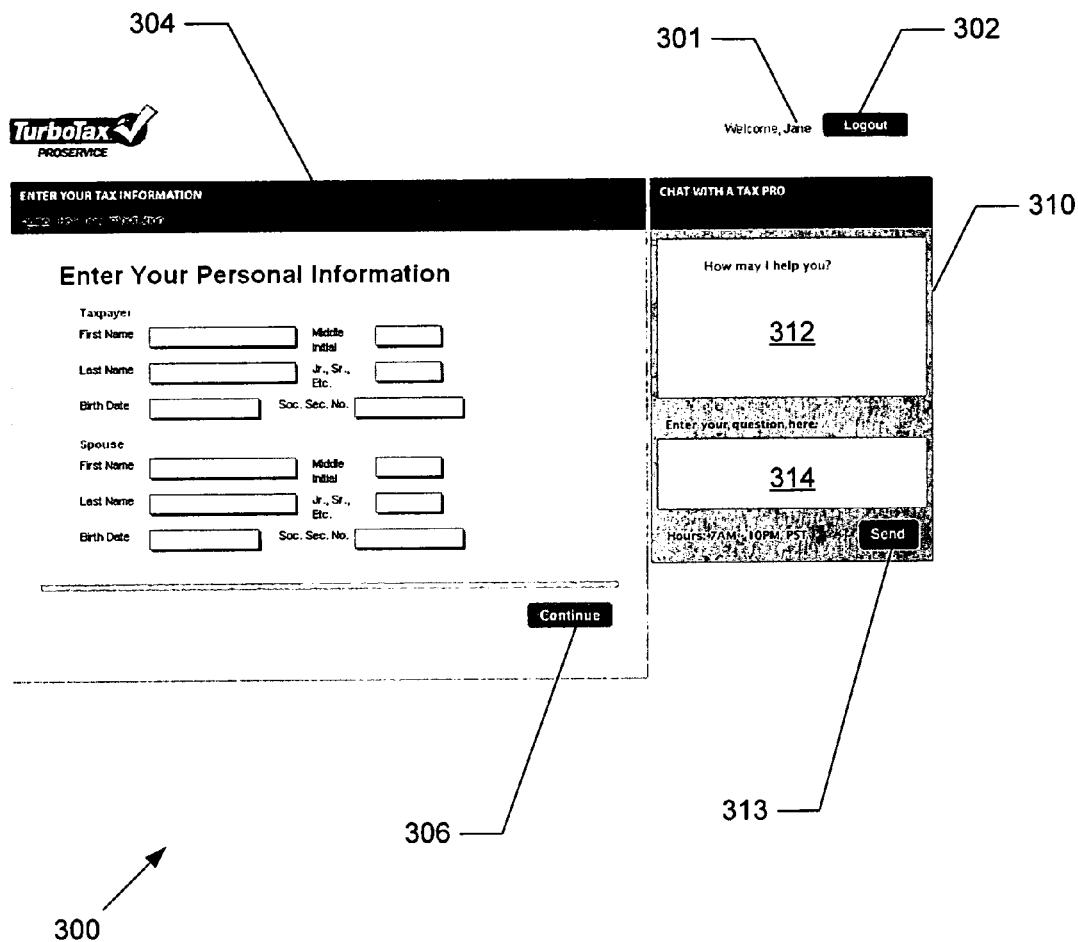
FIG. 3 shows an example of a user interface for integrating a chat window with an online financial document in accordance with one or more embodiments of the invention.

FIG. 3 shows an example of a user interface (300) for an online tax document (304) in accordance with one or more embodiments of the invention. Specifically, FIG. 3 shows that a user (301) (i.e., Jane) is logged onto the TurboTax® software product (i.e., where the logout button (302) indicates that Jane is currently logged in). As shown in FIG. 3, the online tax document (304) contains a form with a plurality of fields associated with a tax application to be completed by the user (301). Upon completing the current page of the online tax document (304), the user (301) can push the 'Continue' button (306) and go to a next page of the online tax document (304).

Further, the example of FIG. 3 shows a chat window (310) displayed on the same screen as the online tax document (304). As described above with respect to FIG. 1, the chat window (310) includes a user response (312) portion with a send button (313) and a real-time chat transcript (314) portion. Thus, while the user (301) completes the online tax document (304), the user can conduct a real-time discussion with a tax professional to receive assistance in completing the online tax document (304).

For example, consider the scenario in which the user (301) (i.e., Jane) has recently been married within the tax year. In this case, Jane may have a question regarding whether or not she should include her spouse's name and information under the "Spouse" portion of the online financial document (304). Jane can ask this question to the tax professional using the chat window, and the tax profession can explain Jane's options to her or provide any other assistance that Jane may require.

As described above, the chat window (310) is constantly visible and remains unaffected by the user's navigation of the online tax document while the user is within the TurboTax® software product. Once the user navigates outside of the TurboTax® software product, the chat window may no longer be visible on every screen of the user's display.

Embodiments of the invention provide a seamless integrated experience for users of a software product that facilitates the user-friendly and easy completion and filing of online financial document to receive assistance associated with the online financial document. The integrated chat window requires no additional downloads or any additional steps that need to be taken by the user, and runs on a standard web browser. Further, one or more embodiments of the invention enable users to chat online with a trained professional in the same window as the actual online financial document that the user is attempting to complete. Further, the chat window is displayed on every screen of the online financial document while remaining unaffected by modifications or navigations among various forms/pages of the online financial document.

Figure 4:
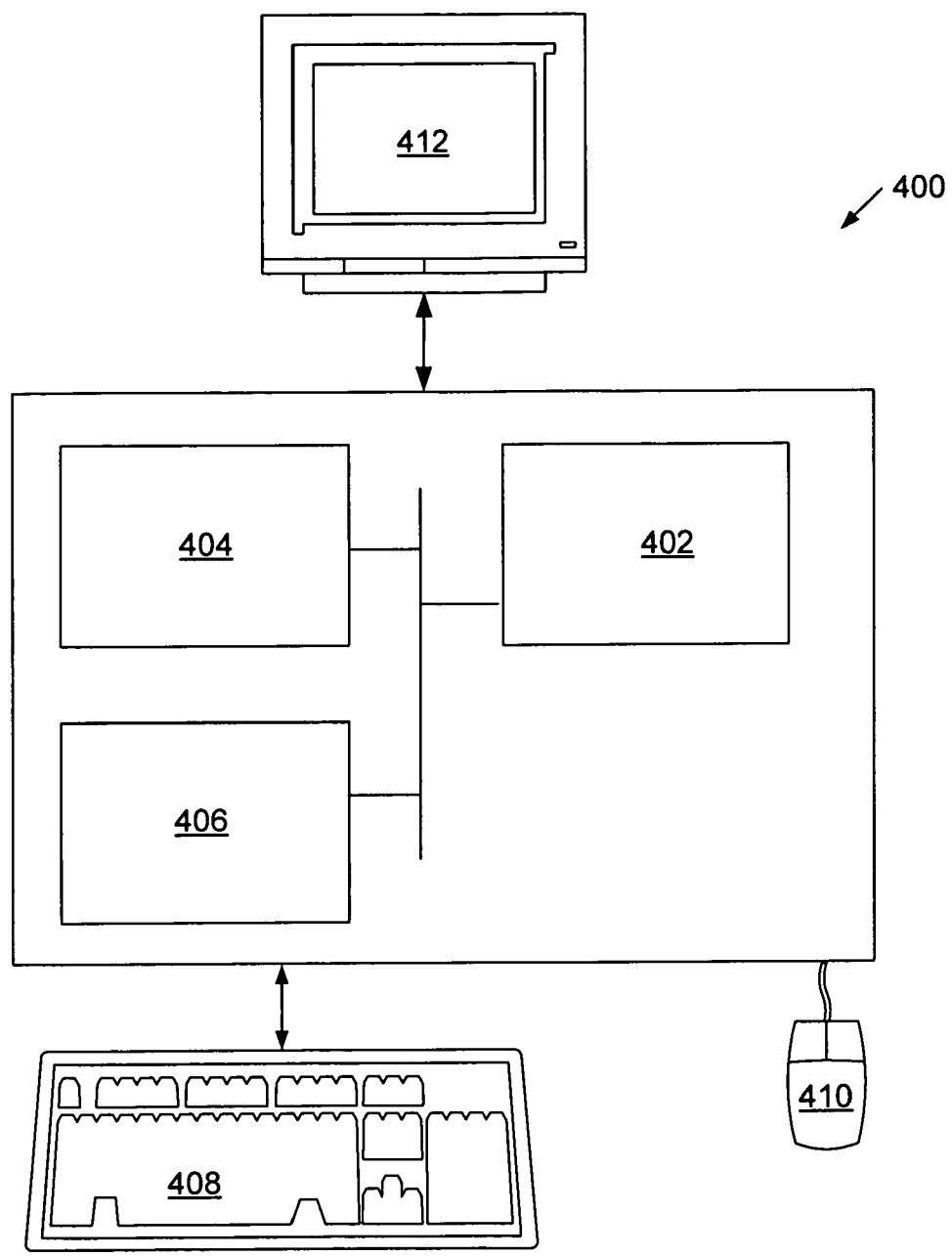
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., chat window, online financial document, etc.) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method comprising:
    while a user completes a first page of an online financial document on a display of a computer, receiving a user-generated request for assistance using a link contained within the first page of the online financial document, wherein the online financial document is contained within a web page;
    in response to the user-generated request, presenting a chat window within the first page of the online financial document, wherein the chat window is configured to allow the user to select a level of expertise required for the user-generated request for assistance;
    facilitating, on the computer, a discussion between the user and a support agent using the chat window to obtain the assistance in completing the first page of the online financial document, wherein the support agent controls the display to complete a portion of the first page of the online financial document while engaging in the discussion in the chat window with the user;
    recording a transcript of the discussion within the chat window, wherein the user and the support agent have access to the transcript of the discussion;
    receiving a completed first page of the online financial document from the user, wherein the user used the assistance provided in the discussion via the chat window to generate the completed first page;
    storing the completed first page of the online financial document;
    receiving a request to present a second page of the online financial document;
    presenting the second page of the online financial document, wherein the chat window is presented, unchanged from the first page, within the second page, wherein the user and the support agent continue the discussion, wherein the transcript of the discussion continues to be recorded within the chat window, and wherein the user and the support agent continue to have access to the transcript of the discussion;
    storing the transcript of the discussion for future access by the user and the support agent;
    closing the online financial document, wherein the chat window closes;
    reopening the online financial document, wherein the user requests new assistance using the link;
    in response to the user selecting the link, presenting a new chat window on the display to request different assistance; and
    facilitating a new discussion in the new chat window between the user and the support agent using the chat window, wherein the user requests the support agent when selecting the link.

2. The method of claim 1, wherein facilitating the discussion comprises:
    transmitting a first message to the support agent about the first page of the online financial document using the chat window; and
    receiving a second message, in response to the first message, from the support agent about the first page of the online financial document using the chat window.

3. The method of claim 2, wherein the first message is transmitted in real time to the support agent and the second message is received in real time from the support agent.

4. The method of claim 2, wherein the support agent is trained in a subject matter related to the first page of the online financial document.

5. The method of claim 2, wherein the support agent is viewing the first page of the online financial document while engaging in the discussion using the chat window.

6. The method of claim 1, further comprising:
    assigning the support agent to the user completing the first page of the online financial document when the user logs onto a financial product comprising the online financial document.

7. The method of claim 1, wherein the online financial document is a tax document.

8. The method of claim 1, wherein the new chat window contains the transcript.

9. A computer system comprising:
    a processor;
    a display; and
    a memory comprising software instructions which, when executed by the processor, enable the computer system to:
        present on the display a web page comprising an online financial document;

present the online financial document comprising a first page displayed on the display and a link configured to open a chat window to request assistance to complete a portion of the first page in the online financial document, wherein the chat window is configured to allow a user to select a level of expertise required for the assistance;

present the chat window displayed on the display with the first page of the online financial document upon selection of the link, wherein the chat window is configured to receive the assistance from a support agent in completing the portion of the first page of the online financial document, wherein the chat window is integrated with the first page of the online financial document, and wherein the support agent controls the display to complete the portion of the first page while engaging in a discussion in the chat window with the user;

record a transcript of the discussion within the chat window, wherein the user and the support agent have access to the transcript of the discussion;

receive a completed first page of the online financial document from the user, wherein the user used the assistance provided in the discussion via the chat window to generate the completed first page;

store the completed first page of the online financial document;

present a second page of the online financial document, wherein the chat window is presented, unchanged from the first page, within the second page, wherein the user and the support agent continue the discussion, wherein the transcript of the discussion continues to be recorded within the chat window, and wherein the user and the support agent continue to have access to the transcript of the discussion;

store the transcript of the discussion for future access by the user and the support agent;

close the online financial document, wherein the chat window closes;

reopen the online financial document, wherein the user requests new assistance using the link;

in response to the user selecting the link, present a new chat window on the display to request different assistance; and facilitate a new discussion in the new chat window between the user and the support agent using the chat window, wherein the user requests the support agent when selecting the link.

10. The computer system of claim 9, wherein the assistance is obtained by:
  transmitting a first message to the support agent about the online financial document using the chat window; and
  receiving a second message, in response to the first message, from the support agent about the online financial document using the chat window.

11. The computer system of claim 10, wherein the first message is transmitted in real time to the support agent and the second message is received in real time from the support agent.

12. The computer system of claim 10, wherein the support agent is trained in a subject matter related to the portion of the form of the online financial document.

13. The computer system of claim 10, wherein the support agent is viewing the form of the online financial document while receiving the first message from the user and sending the second message to the user.

14. The computer system of claim 9, wherein a support agent is assigned to the user completing the first page of the online financial document when the user logs onto a financial product comprising the online financial document.

15. The computer system of claim 9, wherein the first page of the online financial document comprises a plurality of fields to be completed.

16. The computer system of claim 9, wherein the online financial document is a tax document.

17. The computer system of claim 9, wherein the new chat window contains the transcript.

18. A method for providing assistance in a financial document, comprising:
  integrating a chat window with a plurality of pages of an online financial document contained within a web page, wherein integrating the chat window with the plurality of pages of the online financial document comprises:
    displaying a first page of the plurality of pages of the online financial document on a screen of a computer; and
    displaying the chat window on the screen with the first page of the plurality of pages of the online financial document, wherein the chat window is configured to allow a user to select a level of expertise required for the assistance;
  transmitting a first message to a support agent about the first page of the plurality of pages of the online financial document using the chat window on the computer;
  in response to the first message, receiving a second message from the support agent about the first page of the plurality of pages of the online financial document using the chat window on the computer, wherein the support agent controls the screen of the computer to complete a portion of the first page of the plurality of pages of the online financial document while interacting with the user in the chat window, thereby generating an updated first page;
  storing the updated first page of the online financial document;
  receiving a request to present a second page of the plurality of pages of the online financial document;
  presenting the second page of the plurality of pages of the online financial document, wherein the chat window is presented, unchanged from the first page, within the second page, wherein the user and the support agent continue the discussion, wherein the transcript of the discussion continues to be recorded within the chat window, and wherein the user and the support agent continue to have access to the transcript of the discussion;
  storing the transcript of the discussion for future access by the user and the support agent;
  closing the online financial document, wherein the chat window closes;
  reopening the online financial document, wherein the user requests new assistance using the link;
  in response to the user selecting the link, presenting a new chat window on the display to request different assistance; and
  facilitating a new discussion in the new chat window between the user and the support agent using the chat window, wherein the user requests the support agent when selecting the link.

19. A non transitory computer usable medium comprising computer readable program code embodied therein for causing a computer system to:
  while a user completes a first page of an online financial document, receive a request for assistance using a link contained within the first page of the online financial document, wherein the link is configured to open a chat window, wherein the chat window is configured to allow a user to select a level of expertise required for the assistance, and wherein the first page of the online financial document is contained within a web page displayed on a screen of the computer system;

in response to the user-generated request, present a chat window within the first page of the online financial document;

facilitate a discussion between the user and a support agent using the chat window to obtain the assistance in completing the first page of the online financial document, wherein the chat window is integrated with the first page of the online financial document, wherein the support agent controls the screen to complete a portion of the first page of the online financial document while engaging in the discussion in the chat window with the user, and wherein the chat window is displayed on the same screen as the first page of the online financial document;

record a transcript of the discussion within the chat window, wherein the user and the support agent have access to the transcript of the discussion;

receive a completed first page of the financial document from the user using the assistance obtained in the discussion via the chat window to generate the completed first page;

store the completed first page of the online financial document;

receiving a request to present a second page of the online financial document;

presenting the second page of the online financial document, wherein the chat window is presented, unchanged from the first page, within the second page, wherein the user and the support agent continue the discussion, wherein the transcript of the discussion continues to be recorded within the chat window, and wherein the user and the support agent continue to have access to the transcript of the discussion;

storing the transcript of the discussion for future access by the user and the support agent;

closing the online financial document, wherein the chat window closes;

reopening the online financial document, wherein the user requests new assistance using the link;

in response to the user selecting the link, presenting a new chat window on the display to request different assistance; and facilitating a new discussion in the new chat window between the user and the support agent using the chat window, wherein the user requests the support agent when selecting the link.

20. The non transitory computer usable medium of claim 19, wherein facilitating the discussion comprises:

transmitting a first message to the support agent about the first page of the online financial document using the chat window; and receiving a second message from the support agent about the first page of the online financial document using the chat window.

21. The non transitory computer usable medium of claim 20, wherein the first message is transmitted in real time to the support agent and the second message is received in real time from the support agent.

22. The non transitory computer usable medium of claim 20, wherein the support agent is trained in a subject matter related to the first page of the online financial document.

23. The non transitory computer usable medium of claim 20, wherein the support agent is viewing the first page of the online financial document while receiving the first message from the user and sending the second message to the user.

24. The non transitory computer usable medium of claim 19, wherein the new chat window contains the transcript.

\* \* \* \* \*